United States Patent [19]

Ferrigno

[11] 3,928,059

[45] Dec. 23, 1975

[54] HYDROUS MAGNESIUM CONTAINING SILICATE MINERALS WITH REDUCED ABSORBENCIES

[76] Inventor: Thomas Howard Ferrigno, 29 Clover Hill Circle, Trenton, N.J. 08638

[22] Filed: Oct. 4, 1974

[21] Appl. No.: 512,836

Related U.S. Application Data

[63] Continuation-in-part of Ser. No. 306,926, Nov. 15, 1972, Pat. No. 3,856,545.

[52] U.S. Cl............. 106/306; 106/288 B; 106/309; 264/117
[51] Int. Cl.² .......................................... C09C 1/28
[58] Field of Search............ 106/306, 288 G, 308 B, 106/309; 264/117

[56] References Cited
UNITED STATES PATENTS 3,533,821   10/1970   Lundguist ........................... 106/306
3,846,148   11/1974   Nordyke........................... 106/288 B

*Primary Examiner*—Winston A. Douglas
*Assistant Examiner*—J. V. Howard
*Attorney, Agent, or Firm*—Sperry and Zoda

[57] ABSTRACT

Fillers and extenders for use in coatings, paints, plastics, adhesives, sealants and the like are produced by calcining agglomerates consisting primarily of particles of hydrous magnesium containing silicate minerals bonded together by means of feldspar minerals in a manner to form products characterized by their low specific gravity and low liquid absorbing properties by reason of the presence of voids within the agglomerates while presenting a limited outer surface exposed for contact with liquids.

17 Claims, No Drawings

HYDROUS MAGNESIUM CONTAINING SILICATE MINERALS WITH REDUCED ABSORBENCIES

FIELD OF INVENTION

Various hydrous magnesium containing silicate minerals such as talc and the like have been widely used heretofore as fillers and extenders in coating compositions, paints, plastics, adhesives and similar products. However, their usefulness has been limited by the fact that when such minerals are ground or reduced to the form of particles having a suitable size for their intended use they have high surface areas and exhibit poor packing characteristics. As a result such fillers have high sorbency and require relatively large amounts of liquid to effectively wet the surfaces of the particles and to fill the interstitial voids therebetween. Accordingly, when determining oil absorption in accordance with ASTM method D-281, it is found that typical particulate hydrous magnesium containing silicates have porosities of from 42% to 58% based on oil absorption values of 26 to 46 pounds of linseed oil per 100 pounds of mineral. Thus dividing the weights of the mineral and oil by their specific gravities yields the volume of each. The volume of oil divided by the total volume of oil and mineral then obtains the porosity.

SUMMARY OF INVENTION

In accordance with the present invention talc and other hydrous magnesium containing silicate minerals are utilized to produce agglomerates embodying numerous particles bonded together in a manner to obtain substantial voids within the agglomerates while limiting the porosity of the agglomerate to 25% by volume of that of the parent mineral. The density of the filler and its sorbency is thereby reduced compared with the parent mineral and the utility of the parent mineral is increased.

PREFERRED EMBODIMENTS

The hydrous magnesium containing silicate minerals which may be employed in the practice of the present invention may be utilized as such or in the form of substantially any of the naturally occurring or processed ores containing about 65% or more of hydrous magnesium silicates. Typical minerals of this type are the following:

Tremolite — $Ca_2(Mg, Fe)_5 Si_8O_{22} (OH)_2$
Steatite or Talc — $Mg_3(Si_4O_{10}) (OH)_2$
Serpentine — Antigorite - $Mg_6(Si_4O_{10}) (OH)_8$
Chlorite — $Mg_3(Si_4O_{10})(OH)_2Mg_3(OH)_6$ all of which may have varying degrees of substitution by iron, aluminum and other ions for the magnesium ions. Such substitution produces different colors and crystalline habits. Thus, when iron is in excess of 2% in tremolite the mineral is called actinolite. Hornblende is a complex magnesium containing mineral useful where dark colors are acceptable. Similarly, species such as sepiolite also may be used and the chlorite group of minerals which may include clinochlore, penninite, prochlorite and similar species. Among the amphibole group in addition to tremolite are anthophyllite, and glaucophane.

In naturally occurring ores the foregoing minerals may be associated with others such as calcite, dolomite, mica, montmorillonite and quartz while some deposits contain coal, magnesite, garnierite and the like. Those naturally occurring hydrous magnesium containing silicate ores in which up to 35% of other minerals are present may be used in the practice of the present invention.

All of the silicate minerals cited above are characterized by the fact that they are difficult to fuse at 1200°C and the loss of hydroxyl groups as water during calcining causes shrinkage, density increase and frequently further increases their resistance to fusion. However, due to the impurities present in certain of the ores, variations in fusibility, color and processing properties may occur. Most acceptable mineral deposits yield products which are white in color but this is not essential whereas the predominent characteristic of all the minerals cited above is their high porosities as determined by the oil absorption test.

In preparing the hydrous magnesium containing silicate mineral for use it is ground, fractionated or otherwise processed to obtain particles having an average size ranging from about 0.3 to 40 microns although the preferred average size of the particles is about 20 microns or less. However, it is pointed out that the finer particle sizes exhibit greater porosities and surface areas and therefore are benefited more by the present invention.

In accordance with the present invention and in order to reduce the porosity, sorbency and specific gravity of such minerals and improve their properties for use as fillers, extenders and the like in paints, plastics and other compositions, hydrous magnesium containing silicate minerals in particulate form, are mixed with particles of an inorganic permanent binder mineral and a temporary binder. The mixture is then formed into agglomerates and calcined to develop a permanent bond between the hydrous magnesium silicate particles whereby an improved filler is produced.

The permanent inorganic binder employed in forming the agglomerates of the present invention is preferably feldspar which may be used in the form of natural ores that contain at least 50% by weight of feldspar. Thus the feldspar may be anhydrous sodium, potassium, calcium, lithium and barium alumino silicates in either pure form or in admixtures which each other and with impurities such as silica, low concentrations of mica in pegmatities, clay minerals, calcium carbonate, iron oxide and the like. It is preferred to use feldspar in the form of anorthoclase containing predominately sodium alumino silicate with potassium and calcium alumino silicates in lesser proportions. All such minerals or ores may be used provided the feldspar constitutes at least 50% by weight and depending upon the color desired in the filler to be produced.

When producing the agglomerate of the present invention, a temporary binder is used to bond the particles of hydrous magnesium containing mineral and feldspar together sufficiently to enable the agglomerates to be initially formed and to withstand the rigors of handling and treatment prior to and during the calcining operation to which they are subjected. For this purpose expanding lattice montmorillonites, which when dispersed in water swell to several times their original volume, may be used. Such swelling may be regulated by the concentration of the alkali, either natural or added, which is present. Soluble silicates such as the alkali silicates of commerce may be used as well as dispersible organic binders such as starch, lignin, lignin-sulfonates, casein and various cellulose derivitives which which may be consumed upon calcining.

In some operations and in using some minerals when producing the fillers and extenders of the present invention, it is desirable to add fluxing agents to the mixture to aid in the calcining operation and reduce the sorbency and specific gravity of the agglomerates produced. Various compounds of boron, such as boric oxide, borax, colemanite and boric acid may be used for this purpose. Other fluxing aids are various sodium polyphosphates, low melting glasses, frits, lead oxide, barium oxide, soda lime glass and eutectic combinations of various inorganic oxides. These agents serve to assure the formation of strong bonds between the particles and permit calcining at lower temperatures and for shorter periods of time while increasing the strength of the agglomerates so that they will withstand abrasion and attrition during mixing thereof in paints, plastics, adhesives and the like.

When the color of the filler is of importance, opacity modifiers may be added to the mixture used in forming the agglomerates. Those additives which have refractive indices substantially exceeding those of the essential minerals employed may have no distinctive color in themselves but produce white reflectance in the product and increase the opacity thereof. On the other hand, colored additives for producing fillers having distinctive colors may be used. Typical inorganic opacifiers are titanium dioxide, zirconium oxide, zirconium silicate, zirconium double silicates, zirconium carbonate, zinc oxide, calcium titanium silicate, tin oxide, tin hydroxide, antimony oxide, iron oxides, ultramarine, maganese oxides, lead chromate and numerous ceramic colorants of complex, indefinite or proprietary character.

The methods employed for producing the agglomerates may be similar to those by which pigmentary compositions are produced as described in copending application Ser. Nos. 3,856,545; 3,899,346; 3,853,573; 3,853,574 and 3,864,140. For this purpose the hydrous magnesium containing silicate mineral and the feldspar mineral together with any fluxing agent and opacifier or other dry constituents used are mixed together with sufficient water or liquid to permit forming of the agglomerates by means of the particular type of equipment employed. The temporary binder and any processing aids desired are generally added to the liquid used in preparing the agglomerates. Further, since most hydrous magnesium containing silicate minerals have hydrophobic surfaces, various processing aids such as wettants and dispersants may be used in the agglomerate forming mixture. Typical agents of this type are sodium polyphosphate, metal salts of organic acids, polyglycols and derivatives, lignosulfonates, esters, alcohols and the like. These agents are frequently used in combination to reduce the viscosities of slurries for spray drying, produce more effective temporary bonding of the mineral particles, and facilitate agglomerate formation and release when using pelletizing, tableting, extruding or other types of pressure forming equipment.

When producing fillers and extenders in accordance with the present invention the constituents thereof are preferably employed in the following proportions in parts by weight:

| | General | | Preferred | |
|---|---|---|---|---|
| | Min | Max | Min | Max |
| Hydrous magnesium containing silicate minerals | 40 | 75 | 40 | 60 |
| Feldspar minerals | 15 | 40 | 25 | 40 |
| Fluxing Agent-Anhydrous basis | 0 | 10 | 0 | 5 |
| Opacity modifier - anhydrous basis | 0 | 20 | 0 | 10 |
| Temporary binder - anhydrous basis | 1 | 6 | 2 | 5 |

In producing the agglomerates to be calcined, the particulate minerals and optional additives are mixed together with sufficient water or other liquid for forming agglomerates of the size and shape required. The dry ingredients may constitute from about 30 to 95% by weight of the forming mixture depending upon the type of equipment utilized. Spheroidal aggregates may be produced by the use of spray-drying equipment to which a slurry or suspension of the ingredients is supplied or by spraying a solution of the temporary binder into the minerals as they are fed into the pan of a rotary disc pelletizer or tumbling drum. The mixing and forming operations may be carried out in two steps and, if a tableting press is used, a relatively dry mix may be prepared in a ribbon blender or the like. Such mixtures may then be fed to compacting rolls, extruders or similar pre-compacting equipment for subsequent forming into the final shape desired.

The shape and size of the agglomerate prepared for calcining may be varied depending upon the use of the finished product. Spheroids are generally more versatile because of their minimum surface area, minimum abrasiveness, flowability, predictable packing properties, ease of size grading and maximum compressive strength. However, other shapes such as ovate section discs, rods, and polyhedra may be produced as desired to obtain special optical or mechanical effects.

The coarseness parameter of the particle size distribution governs the minimum size of the agglomerate that can be fabricated to contain essentially all of the particles of a distribution. The limiting factor in determining the smallest agglomerate which can be obtained from a given particle size distribution is the largest particles present and their volume since the remaining smaller particles will pack around them. Since the largest particles will be found in plus or minus one percent of the distribution, I use the statistically valid point of 99 percent finer than (or one percent coarser than) the indicated equivalent spherical diameter of a particle size distribution curve. This particle will then represent one percent of the total volume of the particle present. Thus, for simplicity but not a precise definition, it is assumed that the diameter of the smallest agglomerate containing essentially all of the particles of a distribution is 4 times the coarseness parameter value.

The size of the agglomerates will, of course, depend upon the manner in which they are produced. Thus in spray drying, for example, wherein some very small agglomerates may be produced, those agglomerates of a size below 4 times the coarseness parameter may be removed. On the other hand when the agglomerates are produced by pressure forming operations they may be of much larger size. Accordingly, the agglomerates of the present invention may vary in size from about 10 microns or less up to about 1 centimeter depending upon their intended use.

The agglomerates thus prepared may be dried to eliminate excessive water and are calcined at about the melting point of the lowest melting mineral therein.

The temperature and duration of the calcining operation may be varied considerably but is carried out in such a way as to develop strong permanent bonds between the mineral particles and create a surface having relatively low porisity, thus preventing the intrusion of liquid into the voids within the mass. By this means the porosity and specific gravity of the product is reduced substantially below that of the constituents from which it is formed.

Under suitable conditions the agglomerates may be heated rapidly to a temperature at which the surface thereof will fuse sufficiently to develop the desired characteristics in the product. In producing relatively large agglomerates the calcining may be carried out at temperatures of about 1000°C to 1200°C and for periods of from 1 to 15 minutes. For small agglomerates such as those obtained by spray drying and having sizes in the range of 20 to 100 microns the calcining time may be considerably decreased. Of course, fluxing agents exert a considerable influence on these conditions, and may reduce the temperature and time required for calcining the agglomerates to as low as 600°C for very short times.

The calcining may be carried out in any suitable type of equipment. When calcining large agglomerates a rotary fixed hearth and rake or a rotating hearth type of furnace may be used and for smaller agglomerates a fluid-bed furnace wherein heated gases fluidize the bed is preferred so that the agglomerates are separated and prevented from sticking together.

In any event, the formation and calcining of the agglomerates is carried out in a manner to reduce the porosity by volume thereof to less than about 25% of that of the parent magnesium containing silicate mineral as measured by the oil absorption test of ASTM method D-281. Thus, products having porosities in the range of 10 to 15% are readily produced as compared to porosities in the range of 40 to 60% for the hydrous magnesium containing silicate minerals used in the production thereof. Furthermore the specific gravity of the agglomerated product as compared with that of the parent minerals is reduced by 10% or more and is reduced by over 40% in some cases. As a result, the fillers or extenders of the present invention are more readily suspended in liquid media and in compositions such as paints, sealants, plastics, adhesives and the like providing lower viscosities and lower specific gravities, with markedly reduced porosity and sorbency of the filler.

In order to illustrate typical embodiments of the present invention the following examples are cited. In each of these examples the Steawhite is a mineral containing at least 95% talc and having an oil absorption of 35.8 and a calculated porosity of 51.3% by volume and the Sierralite is a mineral containing 95% or more chlorite $Mg(Si_4O_{10})(OH)_2 Mg(OH)_6$ and havin an oil absorption of 29.8 and a calculated porisity of 46.8% by volume. Both products had an average particle size of 10 microns. The mixture identified as 1-44-1 is a temporary binder consisting of 14% by weight, water-free basis, of a white swelling montmorillonite dispersed in water and adjusted with sodium carbonate to 5% sodium oxide. The LU-Spar 4 is anorthoclase feldspar analyzing 67.8% silica, 19.4% alumina, 1.7% lime, 7.0% soda, 3.8% potash and 0.2% ignition loss and having an average particle size of 14 microns. The zirconium silicate had a coarseness of 0.2% + 44 microns and an average particle size of 3.5 microns and a purity of 97.9%.

Using the materials indicated below in parts by weight, agglomerates were formed by mixing the constituents and pressing to form ovate discs of both ¼ and ⅛ inch size in compression molds. The resulting agglomerates were air dried for from one to several hours and calcined in a muffle furnace at the temperatures and for the times indicated below. After cooling, they were tested for specific gravity using a water displacement balance after soaking in water for 15 minutes. Determination of weight before and after soaking was used to calculate the water absorption on which the indicated porosity is based.

| EXAMPLE I | | | | |
|---|---|---|---|---|
| Test No. | 46-4 | 72-1 | 72-2 | 72-3 |
| Steawhite | 98 | 60 | 80 | 40 |
| LU-Spar 4 | — | 38 | 18 | 38 |
| Zirconium silicate | — | — | — | 20 |
| 1-44-1 | 14.3 | 14.3 | 14.3 | — |
| Water | 20 | 24 | 29 | 20 |
| Calcining Min/°C | 10/1150 | 10/1150 | 10/1150 | 10/1150 |
| Calculated Sp. Gr. | 2.74 | 2.68 | 2.71 | 2.91 |
| Determined Sp. Gr. | 2.64 | 2.19 | 2.26 | 2.30 |
| Sp. Gr. reduction % | 4 | 18.3 | 16.6 | 21.0 |
| Water absorption % | 27.0 | 1.7 | 8.8 | 0 |
| Porosity % | 42 | 3 | 16.6 | 0 |

As demonstrated by these tests the addition of the feldspar (LU-Spar 4) to the composition used in forming the agglomerates greatly reduces the specific gravity and porosity of the resulting product. However, as indicated by a comparison of tests Nos. 72-1 and 72-2 the amount of feldspar used should be about 25% or more by weight of the combined hydrous magnesium containing silicate and feldspar in order to reduce the porosity of the product by 25% or more. Further, as illustrated by Test No. 72-3, an opacity modifying agent (zirconium silicate) may serve to replace a portion of the hydrous magnesium containing silicate mineral whereby a filler having a white color is produced.

| EXAMPLE II | | | | |
|---|---|---|---|---|
| Test No. | 45-4 | 50-5 | 50-6 | 50-7 |
| Sierralite | 98 | 73 | — | 48 |
| VH-250 | — | — | 53 | — |
| LU-Spar 4 | — | 20 | 40 | 40 |
| Boric acid | — | 9.1 | 9.1 | 18.2 |
| 1-44-1 | 14.3 | 14.3 | 14.3 | 14.3 |
| Water | 16 | 15 | 14 | 15 |
| Calcining Min/°C | 10/1150 | 10/1150 | 10/1150 | 10/1100 |
| Calculated Sp. Gr. | 2.75 | 2.71 | 2.68 | 2.62 |
| Determined Sp. Gr. | 2.65 | 2.19 | 1.59 | 1.98 |
| Sp. Gr. reduction % | 7 | 19 | 41 | 24 |
| Water absorption % | 28.1 | 0 | 2.4 | 0 |
| Porosity % | 41 | 0 | 3.7 | 0 |

The VH-250 is a product of United Sierra containing 70–80% talc, 15–20% dolomite, 3–5% silica and less than 1% free carbon. It has a specific gravity of 2.75, 98.4% minus 74 microns, an average particle size of 17 microns, and an oil absorption of 26.3 and therefore a porosity of 43.7 percent.

It will be apparent from these tests that the addition of boric acid has a fluxing agent materially aids in reducing the specific gravity, water absorption and porosity of the agglomerates produced.

EXAMPLE III

| Test No. | 72–5 | 72–7 |
|---|---|---|
| Steawhite | 65 | 65 |
| LU-Spar 4 | 28 | 13 |
| Silica | — | 15 |
| Boric Acid | 9/1 | 9.1 |
| Water | 28 | 24 |
| Calcining | 10/1130 | 10/1150 |
| Calculated Sp. Gr. | 2.63 | 2.64 |
| Determined Sp. Gr. | 1.96 | 2.00 |
| Sp. Gr. reduction % | 25.5 | 24.2 |
| Water absorption % | 2.0 | 0 |
| Porosity % | 3.8 | 0 |

The silica used was 100% finer than 74 microns, 10 micron average particle size and had a specific gravity of 2.65.

These tests serve to indicate that silica may be used to replace a portion of the feldspar and illustrate that impure minerals and feldspar containing ores may be used in the composition as the permanent binder.

In order to demonstrate the effect of porosity reduction of the agglomerates of the present invention when used as fillers in liquid containing mixtures, the product of Test No. 72-7 above was compared with the parent Steawhite. For this purpose equal volumes of the agglomerates in the form of ⅛ and ¼ inch ovate discs and Steawhite were employed. When equal volumes of agglomerates and Steawhite were mixed with equal volumes of water, the agglomerates were wet easily and formed a mixture having sufficient free water to completely submerge the discs and form a mobile composition similar to that used for casting. However, the Steawhite and water mixture formed a very stiff mass after considerable, rapid working to disperse the hydrophobic mineral and had to be pressed to release air therefrom. Moreover, the addition of a wettant to the mixture had no effect since the porosity of the Steawhite 51.3% was greater than the volume of the water added.

It is apparent that smaller agglomerates or mixtures of agglomerates of different sizes — say, ¼ inch to 10 or 20 microns — would pack more effectively than those used in the foregoing test and provide even more free liquid and greater mobility or fluidity.

From the foregoing disclosure it will be apparent that a wide range of hydrous magnesium containing silicate and feldspar containing minerals may be employed in the practice of the present invention with or without the addition of opacity modifiers and processing aids. In view thereof it should be understood that the particular embodiments of the invention described above and cited in the examples are intended to be illustrative only and are not intended to limit the scope of the invention.

I claim:

1. A material adapted for use as a filler or extender in paints, plastics or the like consisting essentially of a calcined agglomerate comprising from about 40 to 75 parts by weight of a hydrous magnesium containing silicate mineral, from about 15 to 40 parts by weight of a feldspar mineral; from about 0 to 10 parts by weight of a fluxing agent selected from the group consisting of boric acid, boric oxide, borax, colemanite, sodium polyphosphates, low melting glasses, frits, lead oxide, barium oxide, soda-lime glasses and eutectic combinations of inorganic oxides; from about 0 to 20 parts by weight of an inorganic colorant; and from about 1 to 6 parts by weight of a temporary binder selected from the group consisting of expanding lattice montmorillonites, soluble silicates, starch, polyglycols, lignin, lignin sulfonates and esters, casein and cellulose derivatives; said agglomerates embodying a plurality of mineral particles having an average size of from about 0.3 to 40 microns bonded together to form agglomerates having an average size of from about 10 microns to ¼ inch and having a porosity of less than about 25% by volume of that of the parent hydrous magnesium containing silicate mineral.

2. A material as defined in claim 1 wherein said mineral particles have an average size of about 0.3 to 20 microns.

3. A material as defined in claim 1 wherein said hydrous magnesium containing silicate mineral is selected from the group consisting of talc, tremolite, serpentine, chlorite and mixture thereof.

4. A material as defined in claim 1 wherein said feldspar mineral is selected from the group consisting of the anhydrous alumino silicates of sodium, potassium and calcium and mixtures thereof.

5. A material as defined in claim 1 wherein said hydrous magnesium containing silicate mineral is a naturally occurring ore containing no more than 35% of other minerals.

6. A material as defined in claim 1 wherein said feldspar mineral is a naturally occurring ore containing at least 50% of feldspar.

7. A material as defined in claim 1 which has a specific gravity not exceeding 90% of that of the parent minerals.

8. A material as defined in claim 1 having the following composition in parts by weight:

| | |
|---|---|
| Hydrous magnesium containing silicate mineral | 40 to 60 |
| Feldspar mineral | 25 to 40 |
| Fluxing agent | 0 to 5 |
| Opacity modifier | 0 to 10 |
| Temporary binder | 2 to 5 |

9. A material as defined in claim 1 wherein said agglomerates are the product resulting from the forming of a mixture containing said constituents together with from about 5 to 70% by weight of water followed by drying and calcining thereof.

10. A material as defined in claim 9 wherein said agglomerate is calcined at a temperature about 600°C to 1200°C.

11. The method of making a material adapted for use as a filler, extender or the like which comprises mixing together from about 40 to 75 parts by weight of hydrous magnesium containing mineral, from about 15 to 40 parts by weight of feldspar mineral; from 0 to 10 parts by weight of a fluxing agent selected from the group consisting of boric acid, boric oxide, borax, colemanite, sodium polyphosphates, low melting glasses, frits, lead oxide, barium oxide, soda-lime glasses and eutectic combinations of inorganic oxides; from about 0 to 20 parts by weight of an inorganic colorant; and from about 1 to 6 parts by weight of a temporary binder selected from the group consisting of expanding lattice montmorillonites, soluable silicates, starch, polyglycols, lignin, lignin sulfonates and esters, casein and cellulose derivatives; said minerals having an average particle size of from about 0.3 to 10 microns, combining the mixed constituents with water to produce a forming mixture containing from about 5 to 70% of water, forming agglomerates having an average size of from about 10 microns to ¼ inch from said forming mixture, drying said agglomerates and calcining the agglomerates.

12. The method as defined in claim 11 wherein said hydrous magnesium containing silicate mineral is talc.

13. The method as defined in claim 11 wherein said hydrous magnesium containing silicate mineral contains less than 35% of other minerals.

14. The method as defined in claim 11 wherein said feldspar mineral contains at least 50% of feldspar.

15. The method as defined in claim 11 wherein said temporary binder is an expanding lattice montmorillonite.

16. The method as defined in claim 11 wherein a fluxing agent, which is a boron compound, is a constituent thereof.

17. The method as defined in claim 11 wherein an opacity modifier consisting of an inorganic ceramic colorant is a constituent thereof.

* * * * *